(12) United States Patent
Suh et al.

(10) Patent No.: US 10,511,038 B2
(45) Date of Patent: Dec. 17, 2019

(54) APPARATUS AND METHOD FOR CONTROLLING HYDROGEN PURGING

(71) Applicant: Hyundai Motor Company, Seoul (KR)

(72) Inventors: Kyung Won Suh, Seoul (KR); Sang Uk Kwon, Gyeonggi-do (KR); Kyu Il Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 325 days.

(21) Appl. No.: 14/695,077

(22) Filed: Apr. 24, 2015

(65) Prior Publication Data
US 2016/0164124 A1 Jun. 9, 2016

(30) Foreign Application Priority Data
Dec. 9, 2014 (KR) ........................ 10-2014-0176007

(51) Int. Cl.
| H01M 8/04223 | (2016.01) |
| H01M 8/043 | (2016.01) |
| H01M 8/04791 | (2016.01) |
| B60L 11/18 | (2006.01) |

(52) U.S. Cl.
CPC ... *H01M 8/04231* (2013.01); *H01M 8/04798* (2013.01); *H01M 2250/20* (2013.01)

(58) Field of Classification Search
CPC ......... H01M 2250/20; H01M 8/04231; H01M 8/04604; H01M 8/04798
See application file for complete search history.

(56) References Cited

U.S. PATENT DOCUMENTS

2003/0022041 A1* 1/2003 Barton .............. H01M 8/04231
 429/432
2005/0277005 A1* 12/2005 Itou ................... H01M 8/04097
 429/415

FOREIGN PATENT DOCUMENTS

| JP | 2004-071307 | 3/2004 |
| JP | 2004-172047 | 6/2004 |
| JP | 2008-269910 A | 11/2008 |
| JP | 2008-300261 | 12/2008 |
| JP | 2009-176493 | 8/2009 |
| KR | 10-2012-0045278 A | 5/2012 |

* cited by examiner

*Primary Examiner* — Adam A Arciero
(74) *Attorney, Agent, or Firm* — Mintz Levin Cohn Ferris Glovsky and Popeo, P.C.; Peter F. Corless

(57) ABSTRACT

An apparatus and method for controlling hydrogen purging are provided. The hydrogen purging control apparatus includes a purge valve that is disposed at an outlet on an anode side of a fuel cell stack and is configured to adjust an amount of emission of hydrogen containing impurities. Additionally, a controller is configured to adjust an opening and closing cycle of the purge valve based on a required output or an output current of the fuel cell stack.

5 Claims, 7 Drawing Sheets

APPARATUS AND METHOD FOR CONTROLLING HYDROGEN PURGING

CROSS REFERENCE TO RELATED APPLICATION

The present application claims priority of Korean Patent Application Number 10-2014-0176007 filed on Dec. 9, 2014, the entire contents of which application are incorporated herein for all purposes by this reference.

BACKGROUND

1. Field of the Invention

The present invention generally relates to an apparatus and method for controlling hydrogen purging and, more particularly, to an apparatus and method for controlling hydrogen purging, which varies a hydrogen purging period based on a driving style of a driver.

2. Description of the Related Art

A fuel cell vehicle includes a fuel cell stack in which a plurality of fuel cells used as a power source are stacked, a fuel supply system configured to supply hydrogen or the like, which is a fuel, to the fuel cell stack, an air supply system configured to supply oxygen, which is an oxidant required for electrochemical reactions, a water/heat management system configured to adjust the temperature of the fuel cell stack, etc. The fuel supply system is configured to decompress compressed hydrogen in a hydrogen tank, and supply the decompressed hydrogen to the fuel electrode (anode) of the stack, and the air supply system is configured to supply external air, suctioned by operating an air blower, to the air electrode (cathode) of the stack.

When hydrogen is supplied to the anode of the stack and oxygen is supplied to the cathode, hydrogen ions are separated at the anode via a catalytic reaction. The separated hydrogen ions are transferred to an oxidation electrode, which is the cathode, through a membrane. The hydrogen ions separated at the anode, and electrons and oxygen together cause an electrochemical reaction at the oxidation electrode, and thus electrical energy can be obtained through such a reaction. In particular, an electrochemical oxidation of hydrogen occurs at the anode, and an electrochemical reduction of oxygen occurs at the cathode. Due to the movement of electrons generated in this procedure, electricity and heat are generated, and vapor or water is generated due to a chemical action in which hydrogen and oxygen combine. Further, nitrogen that occupies the largest part of atmospheric air may be transferred to the anode through the membrane due to diffusion on the cathode. Such nitrogen acts as an impurity on a hydrogen electrode. Hydrogen purging is performed to remove nitrogen, that is, the impurity. Hydrogen purging is required to remove such impurities, but hydrogen purging wastes hydrogen to be used as fuel, and thus the hydrogen utilization rate decreases, thus deteriorating driving efficiency.

SUMMARY

The present invention provides an apparatus and method for controlling hydrogen purging, which varies a hydrogen purging period based on a driver's driving style.

In An apparatus for controlling hydrogen purging according to an exemplary embodiment of the present invention may include a purge valve disposed at an outlet on an anode side of a fuel cell stack and configured to adjust an amount of emission of hydrogen containing impurities; and a controller configured to operate and adjust an opening and closing cycle of the purge valve based on a required output or an output current of the fuel cell stack.

The controller may be configured to, when a moving average of the required output or the output current of the fuel cell stack is greater than a preset reference value, decrease the opening and closing cycle of the purge valve. The controller may be configured to, when a moving average of the required output or the output current of the fuel cell stack is less than or equal to a preset reference value, increase the opening and closing cycle of the purge valve. Further, the controller may be configured to classify driving states of a fuel cell vehicle into a plurality of driving levels, based on a magnitude of the required output or the output current of the fuel cell stack. The controller may be configured to vary the opening and closing cycle of the purge value to correspond to the plurality of classified driving levels.

The driving levels may include a first level at which the magnitude of the required output or the output current of the fuel cell stack is less than or equal to a reference value preset for the required output or the output current, and a second level at which the magnitude of the required output or the output current of the fuel cell stack is greater than the preset reference value. The controller may be configured to adjust the purge value to cause the opening and closing cycle of the purge valve when the driving level is the second level to be shorter than when the driving level is the first level. The controller may be configured to increase an opening time of the purge valve in a transition period during which the driving level transitions from the first level to the second level while driving at the first level.

Further, a method for controlling hydrogen purging according to an exemplary embodiment of the present invention may include determining a driving level based on a required output or an output current of a fuel cell stack; and varying an opening and closing cycle of a purge valve based on the determined driving level, wherein the purge valve may be disposed at an outlet on an anode side of the fuel cell stack and may be configured to adjust an amount of emission of hydrogen containing impurities. Determining the driving level may include determining the driving level to be a first level or a second level based on whether a moving average of the required output or the output current of the fuel cell stack is greater than a preset reference value.

Determining the driving level may include classifying driving levels into a first level at which a magnitude of the required output or the output current of the fuel cell stack is less than or equal to a reference value preset for the required output or the output current, and a second level at which the magnitude of the required output or the output current of the fuel cell stack is greater than the preset reference value. Additionally, varying the opening and closing cycle of the purge valve may include, when the moving average of the required output or the output current of the fuel cell stack is greater than the preset reference value, decreasing the opening and closing cycle of the purge valve.

The determination of the driving level may further include determining which one of the classified first and second levels a driving level for a preset period of time corresponds to. In addition, varying the opening and closing cycle of the purge valve may include varying the opening and closing cycle of the purge valve to cause the opening and closing cycle of the purge valve when the driving level is the second level to be shorter than that when the driving level is the first level.

The method may further include performing driving by adjusting the opening and closing cycle of purge valve (e.g., by operating the purge valve) to correspond to the determined driving level. The method may further include, when the driving level transitions from the first level to the second level while driving, increasing an opening time of the purge valve in a transition period during which the driving level makes the transition.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
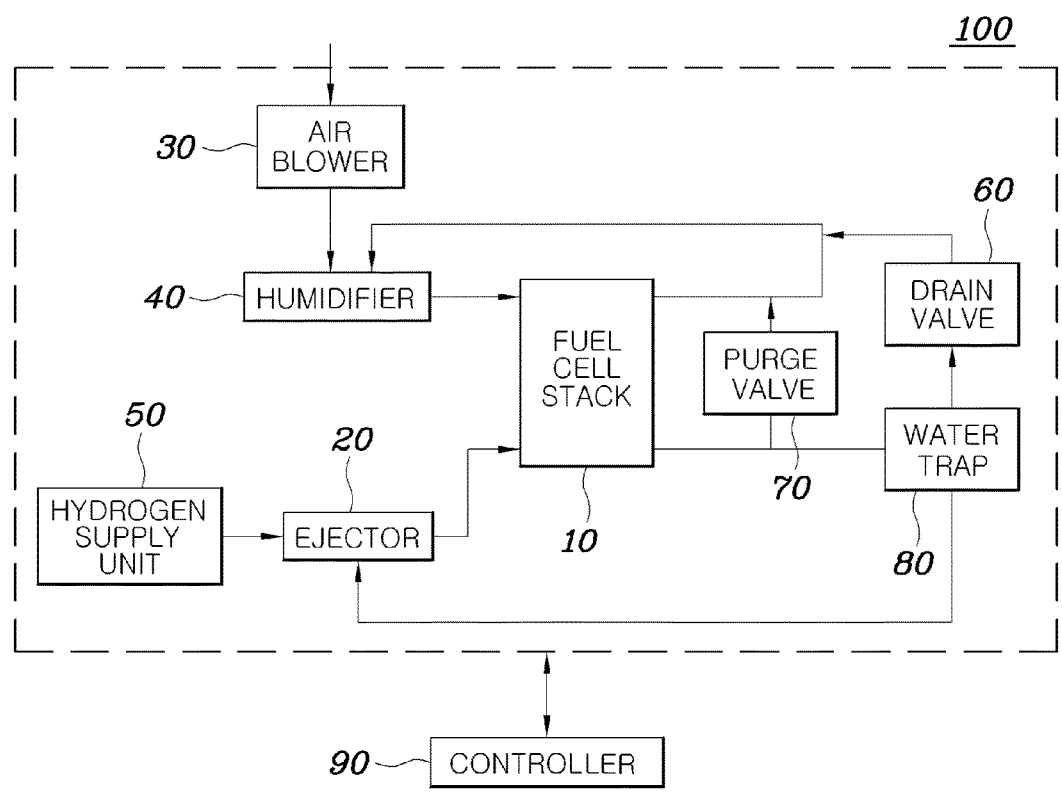
FIG. 1 is an exemplary diagram showing a fuel cell system according to an exemplary embodiment of the present invention.

Specific structural or functional descriptions related to exemplary embodiments according to the present invention and disclosed in the present specification or application are merely illustrated to describe exemplary embodiments of the present invention, and the exemplary embodiments of the present invention may be implemented in various forms and should not be interpreted as being limited to the above exemplary embodiments described in the present specification or application.

The exemplary embodiments according to the present invention may be modified in various manners and may have various forms, so that specific embodiments are intended to be illustrated in the drawings and described in detail in the present specification or application. However, it should be understood that those exemplary embodiments are not intended to limit the exemplary embodiments based on the concept of the present invention to specific disclosure forms and they include all changes, equivalents or modifications included in the spirit and scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

The terms such as "first" and "second" may be used to describe various components, but those components should not be limited by the terms. The terms are merely used to distinguish one component from other components, and a first component may be designated as a second component and a second component may be designated as a first component in the similar manner, without departing from the scope based on the concept of the present invention.

Throughout the entire specification, it should be understood that a representation indicating that a first component is "connected" or "coupled" to a second component may include the case when the first component is connected or coupled to the second component with some other component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components. Other representations describing relationships among components, that is, "between" and "directly between" or "adjacent to," and "directly adjacent to," should be interpreted in similar manners.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Hereinafter, exemplary embodiments of the present invention will be described in detail with reference to the attached drawings. The same reference numerals are used throughout the different drawings to designate the same or similar components.

FIG. 1 is an exemplary diagram showing a fuel cell system 200 according to an exemplary embodiment of the present invention. Referring to FIG. 1, the fuel cell system

200 may include a fuel cell stack 10, an ejector 20, an air blower 30, a humidifier 40, a hydrogen supply unit 50, a drain valve 60, a purge valve 70, a water trap 80, and a controller 90. Some of the components of the fuel cell system 200 are well known to those skilled in the art, and thus a description of those components will be omitted.

The hydrogen supply unit 50 may be a typical hydrogen tank, and may be configured to store high-pressure hydrogen and supply the stored high-pressure hydrogen to the fuel cell stack 10. The high-pressure hydrogen output from the hydrogen supply unit 50 may be decompressed by a pressure regulator, a pressure control valve, an injector, a pressure control actuator, etc. (not shown), and then may be supplied, together with inhaled recirculating gas, by the ejector 20 to the fuel cell stack 10.

The ejector 20 may be configured to supply low-pressure hydrogen, decompressed from high-pressure hydrogen and supplied through the hydrogen supply unit 50, to the fuel cell stack 10. In addition, via use of low pressure formed by a high-speed hydrogen jet when the high-pressure hydrogen passes through a nozzle (e.g., a reduction nozzle or a reduction-magnification nozzle), the ejector 20 may be configured to suction unreacted hydrogen and recirculate the suctioned hydrogen.

The purge valve 70 may be a valve configured to remove impurities from the anode of the fuel cell stack 10. Water generated by an electrochemical reaction in a fuel cell may be stored in the fuel cell stack 10 and may be smoothly discharged to the exterior of the fuel cell stack 10. When water is not sufficiently discharged from the inside of the fuel cell stack 10, that is, when water is in a flooding state, the supply of hydrogen, that is, fuel is interfered with, the power generation performance of the fuel cell stack 10 may be deteriorated. In severe cases, the components of the fuel cell stack 10 may burnt.

Further, hydrogen purging is required to manage the amount of nitrogen (e.g., an impurity), diffused and flowing from the cathode through a membrane, and the amount of hydrogen purging may be changed by adjusting the opening and closing cycle of the purge valve 70. Accordingly, the flow rate of a fluid (e.g., mixture gas containing moisture) within the fuel cell stack 10 may be increased by increasing the amount of flow of hydrogen in the fuel cell stack 10. In other words, to remove impurities in the fuel cell stack 10, the amount of hydrogen flow in the fuel cell stack 10 may be temporarily increased by opening the purge valve 70.

Additionally, to maintain hydrogen concentration in the anode at high level while increasing the amount of hydrogen for purging by frequently opening and closing the purge valve 70, the degradation of the membrane may be prevented, and hydrogen utilization rate may be reduced. When the opening and closing frequency of the purge valve 70 is decreased, the amount of hydrogen decreases while an amount of impurities increases and thus, the membrane of the fuel cell stack 10 may be degraded. When the operation temperature and humidity of the fuel cell stack 10 are desirably maintained, the amount of diffusion (e.g., amount of crossover) of nitrogen through the membrane may be determined by an accumulative time. Therefore, to maintain a suitable accumulation amount (e.g., target accumulation amount) of nitrogen in the anode, the opening and closing of the purge valve 70 may be performed at regular periods.

The controller 90 may be configured to adjust hydrogen purging by adjusting the opening and closing of the purge valve 70. The controller 90 may further be configured to determine at least one of a driving style and a driving condition upon adjusting the opening and closing of the purge valve 70. For example, in response to determining, based on a preset condition, that the driver has a relatively mild (e.g., non-aggressive) driving style, or when a driving condition corresponds to driving on a continuous level ground or a continuous downhill road, the controller 90 may be configured to operate the purge valve 70 to increase the opening and closing cycle of the purge valve 70. Further, in response to determining, based on a preset condition, that the driver has a relatively aggressive driving style, or when a driving condition corresponds to driving on repetitive uphill and downhill roads and the repetition of stop and driving (e.g., frequent acceleration engagement), the controller 90 may be configured to operate the purge valve 70 to decrease the opening and closing cycle of the purge valve 70.

The amount of crossover of nitrogen over time may be represented by the following Equation (1):

$$m_{N_2} = D_{N_2} A_{FC} n_{FC} \frac{P_{ca,N_2} - P_{An,N_2}}{d_{membrane}} \quad (1)$$

wherein $m_{N_2}$ denotes the amount of crossover of nitrogen per time, $D_{N_2}$ denotes the diffusion coefficient of nitrogen, $A_{FC}$ denotes the area of the fuel cell of the fuel cell stack, and $n_{FC}$ denotes the number of fuel cells. $P_{ca,N_2} - P_{An,N_2}$ denotes a difference between the nitrogen pressures of the cathode and the anode, and $d_{membrane}$ denotes the thickness of the membrane.

Figure 2:
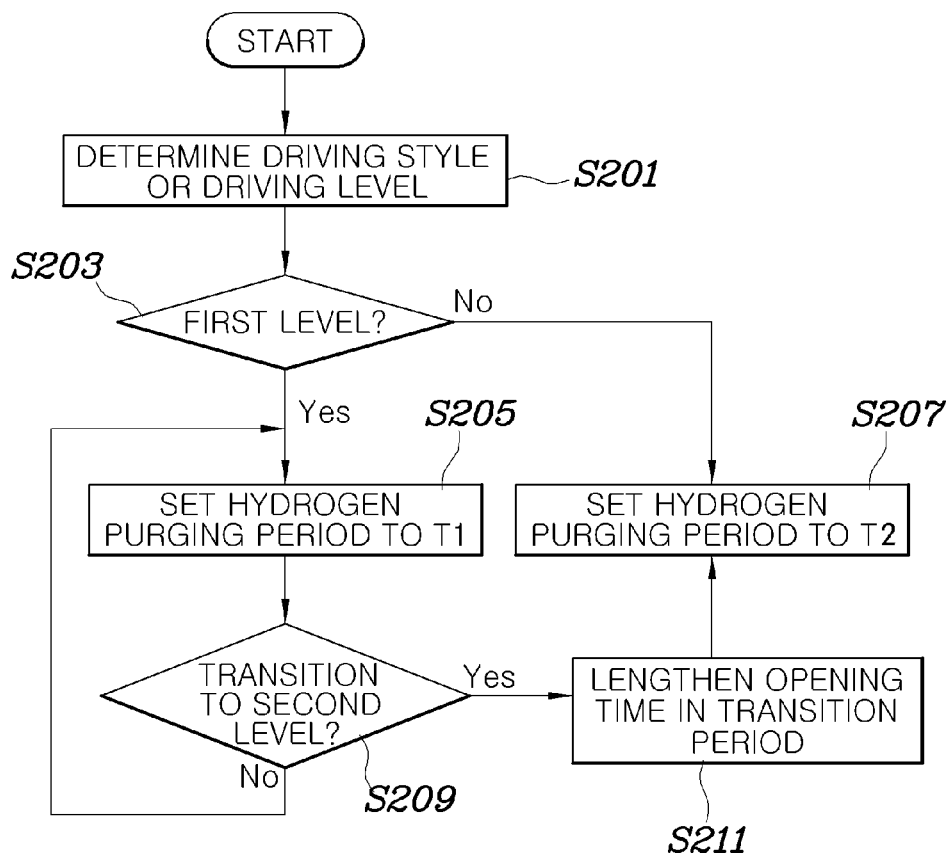
FIG. 2 is an exemplary flowchart briefly showing a method for controlling hydrogen purging according to an exemplary embodiment of the present invention.

FIG. 2 is an exemplary flowchart briefly showing a method for controlling hydrogen purging according to an exemplary embodiment of the present invention. FIGS. 3 to 8 are exemplary graphs showing the hydrogen purging control method according to the embodiment of the present invention can be used. In the hydrogen purging control method according to the exemplary embodiment of the present invention, when the operation of each fuel cell is started, the controller 90 may be configured to determine a driving style or a driving condition (e.g., driving level) at step S201. Based on the required output of the fuel cell stack or the output current of the fuel cell stack, the driving level may be determined.

Figure 3:
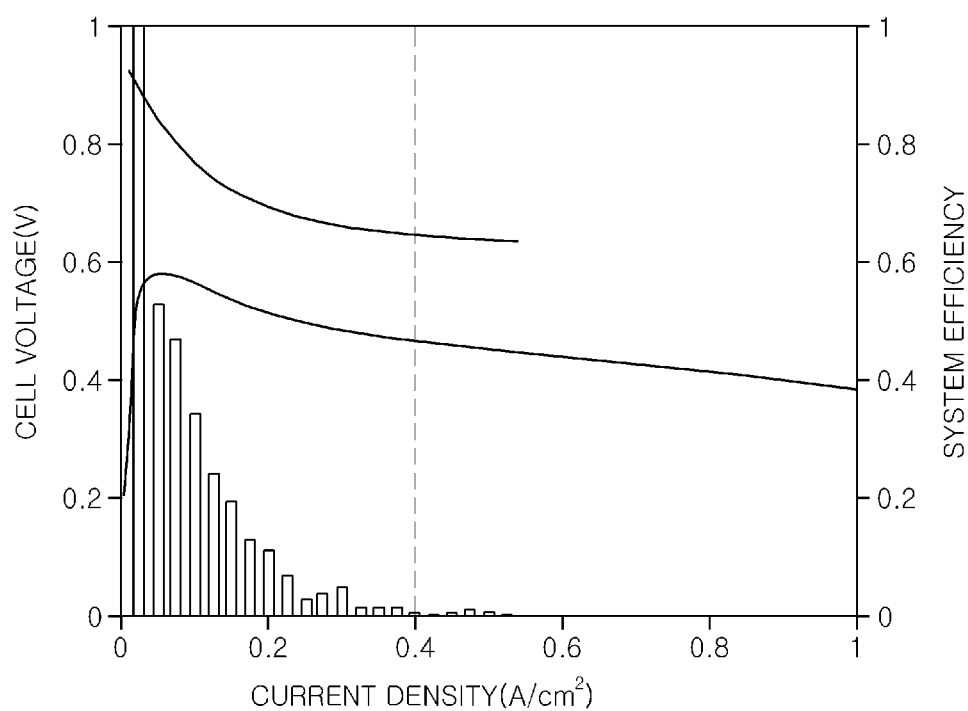
FIGS. 3 to 8 are exemplary graphs showing hydrogen purging control method according to the exemplary embodiment of the present invention.
Figure 4:
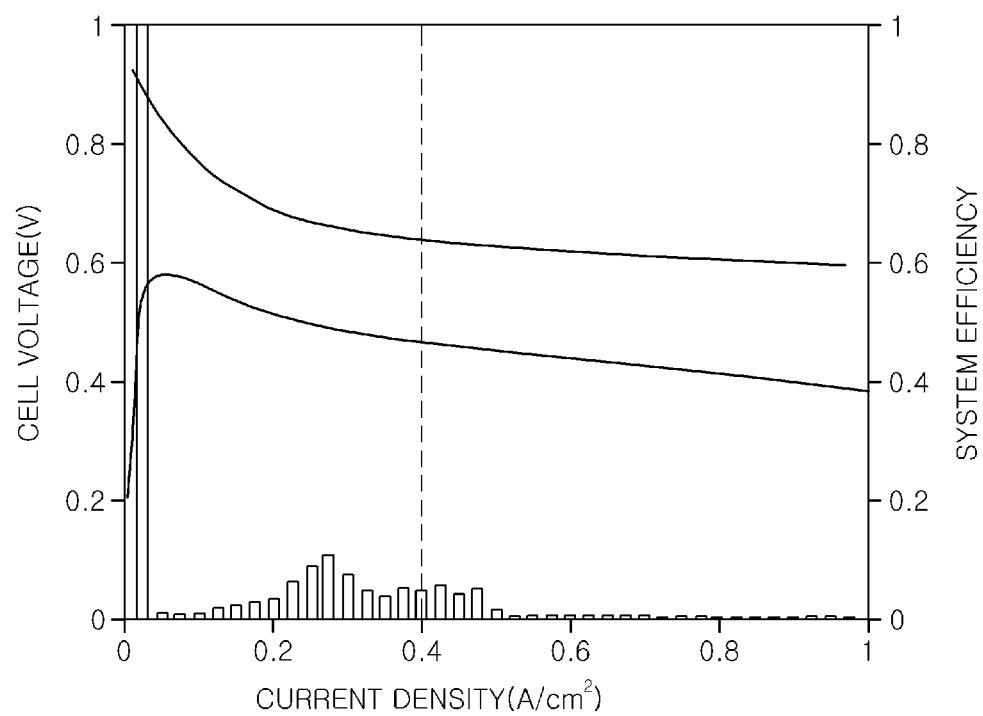

The determination of the driving level may be performed by determining whether driving frequency at high current density is high (e.g., greater than a predetermined current density), whether the moving average of the required output or the output current of the fuel cell stack exceeds a preset reference value, etc. For example, FIGS. 3 and 4 are exemplary graphs showing the current density, cell voltage and fuel cell system efficiency when the driver has a mild driving style (e.g., a first level) and has an aggressive driving style (e.g., second level). To increase the amount of power generation by increasing current density for power generation, the amount of supply of oxygen and hydrogen may be increased. As the current density increases, the system efficiency may decrease, and thus the output may be increased.

In other words, to detect the driving style or the driving condition, the controller 90 may be configured to monitor a variation in current density or the like, determine that the driving style or the driving condition is a first level when the magnitude of the current density of the fuel cell stack is less than or equal to a preset reference current density (e.g., 0.4 A/cm$^2$ in the examples of FIGS. 3 and 4) within a predetermined period of time, and determine that the driving style or the driving condition is a second level when the magnitude of current density is greater than the reference current density at step S203. When the magnitude of current density is substantial, the required output value may be expected to be increased. Thus, when the magnitude of current density is measured as a value greater than the reference current density, the driver may be determined to have a dynamic driving style or the driving condition may be determined to be strict. Further, when the magnitude of current density is minimal, the required output value may be expected to be decreased. Thus, when the magnitude of current density is measured as a value less than the reference current density, the driver may be determined have a mild driving style or the driving condition may be determined to be moderate.

For example, when an output required by the system is substantially high due to sudden repetitions of acceleration and deceleration, driving frequency may be increased in an area in which the magnitude of current density is greater than the reference current density. In particular, an aggressive driving style may be determined. In addition, in response to determining the driving style or the driving condition is the first level at step S205, the amount of reacting hydrogen required in the entire area of the membrane may be minimal and then a probability of the fuel cell stack 10 being degraded may be reduced. Accordingly, even when a hydrogen concentration is relatively low, errors or failures may be prevented. The controller 90 may thus improve a hydrogen utilization rate and fuel cell system efficiency by increasing the opening and closing cycle of the purge valve 70. In other words, when the driving style or the driving condition is determined to be the first level, the controller 90 may be configured to set the opening and closing cycle of the purge valve 70 to T1.

Moreover, in response to determining that the driving style or the driving condition is the second level at step S207, the amount of reacting hydrogen required in the entire area of the membrane is substantial, and thus hydrogen concentration may be increased to a particularly high level. Therefore, the controller 90 may be configured to increase the amount of hydrogen for purging compared to when the driving style or the driving condition is the first level, by decreasing the opening and closing cycle of the purge valve 70, thus decreasing the concentration of impurities in the anode. In other words, when the driving style or the driving condition is determined to be the second level, the controller 90 may be configured to set the opening and closing cycle of the purge valve 70 to T2. In particular, T1 may be greater than T2.

At step S209, the controller 90 may be configured to monitor and determine whether the driving style or the driving condition varies, and the driving level transitions to the second level while determining the driving style or the driving condition to be the first level, setting the opening and closing cycle of the purge valve 70 to T1 based on the first level, and driving the vehicle. In response to determining a required a transition to the second level, controller 90 may be configured to set the opening time of the purge valve 70 to an extended period of time in a transition period or a boundary period from the first level to the second level at step S211. When the driving level has transitioned to the second level, the controller 90 may be configured to operate the purge valve 70 to have a hydrogen purging period of T2 suitable for the second level at step S207.

Figure 5:
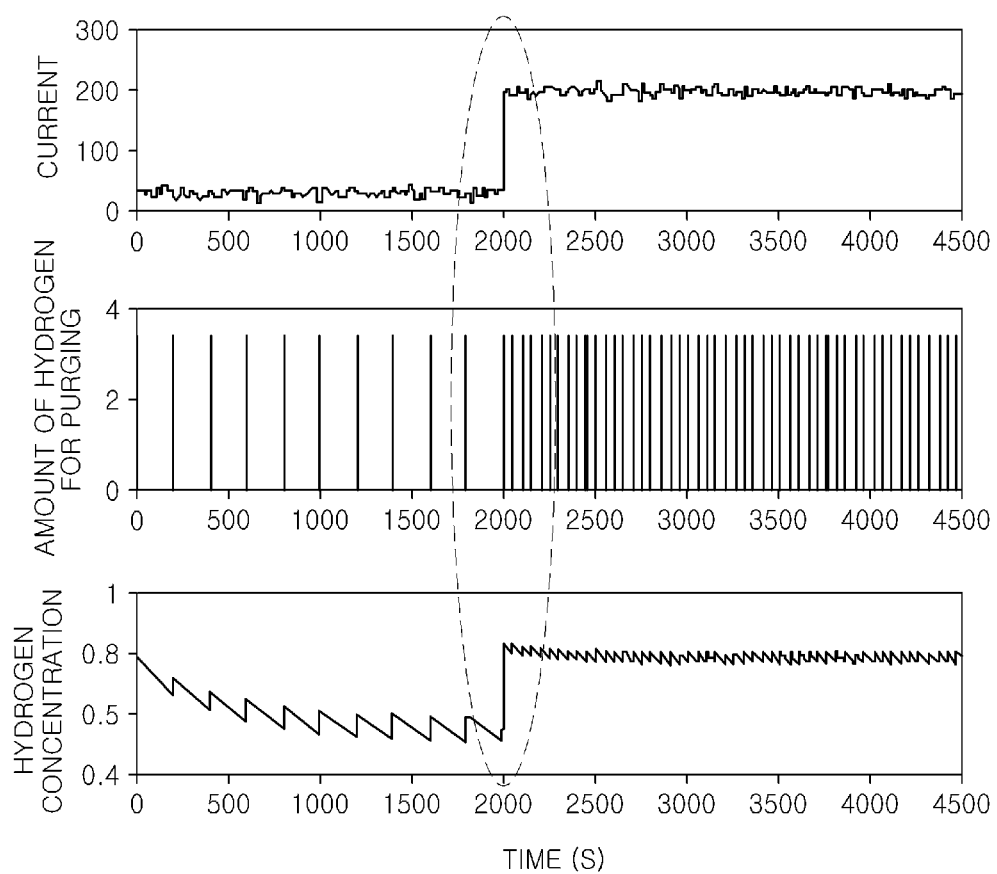
Figure 6:
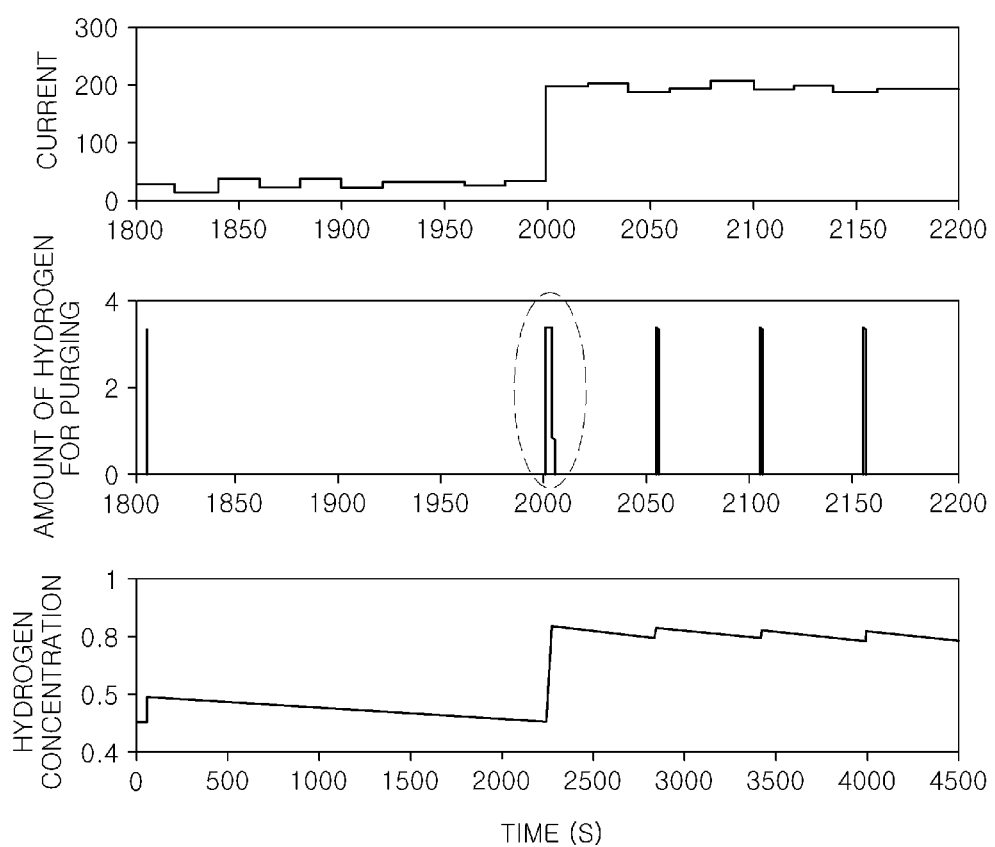

FIG. 5 is an exemplary graph showing variations in current magnitude, a purging period, and hydrogen concentration over time upon transitioning from the first level to the second level. It can be seen that a transition from the first level to the second level has been made in a marked portion of the drawing. For example, when 2000 seconds have elapsed, as the current magnitude increases significantly, the purging period has decreased and then hydrogen concentration has increased. Referring to FIG. 6, compared to the example of FIG. 5, when 2000 seconds have elapsed, the opening time of the purge valve 70 is substantial (e.g., an extended period of time). In other words, in a boundary in which the transition from the first level to the second level is performed, that is, in a transition period, the opening time of the purge valve 70 may be further extended or increased compared to other opening times, and the amount of emission of impurities may be increased, thus enabling hydrogen concentration to be increased within a short period of time.

Figure 7:
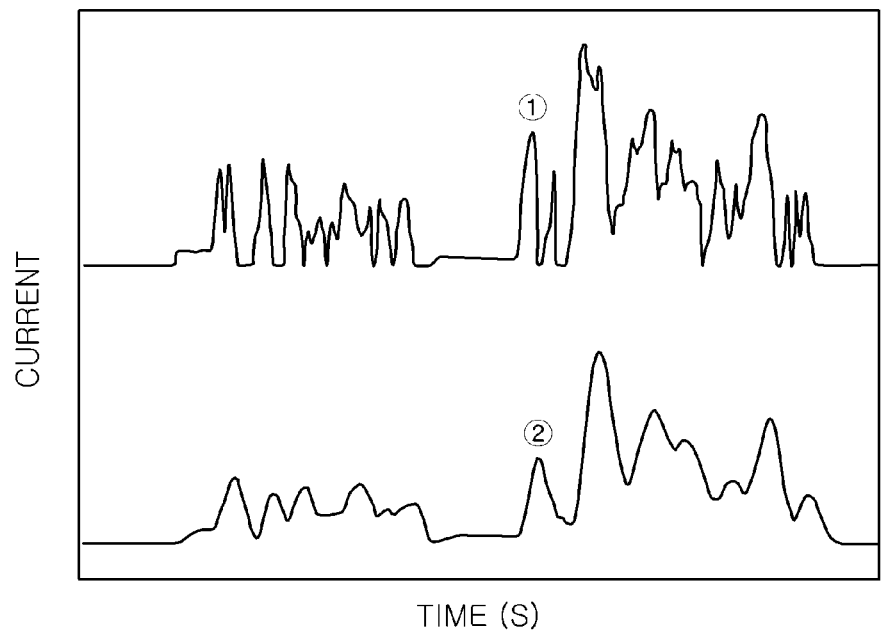

FIG. 7 is an exemplary graph showing an example in which it is determined whether a driving style or a driving condition corresponds to a first level or a second level. Criteria for determining whether the driving style or the driving condition corresponds to a first level or a second level may include the output current or the required output of a fuel cell stack, the acceleration intention, or the like. For example, the controller 90 may be configured to calculate, for the moving average ② of current ① shown in FIG. 7, that is, for each term of time-series, real-time averages of a predetermined number of previous and subsequent terms with respect to the term, and may be configured to determine that the driving style or the driving condition corresponds to the second level when the moving average exceeds a specific threshold.

Figure 8:
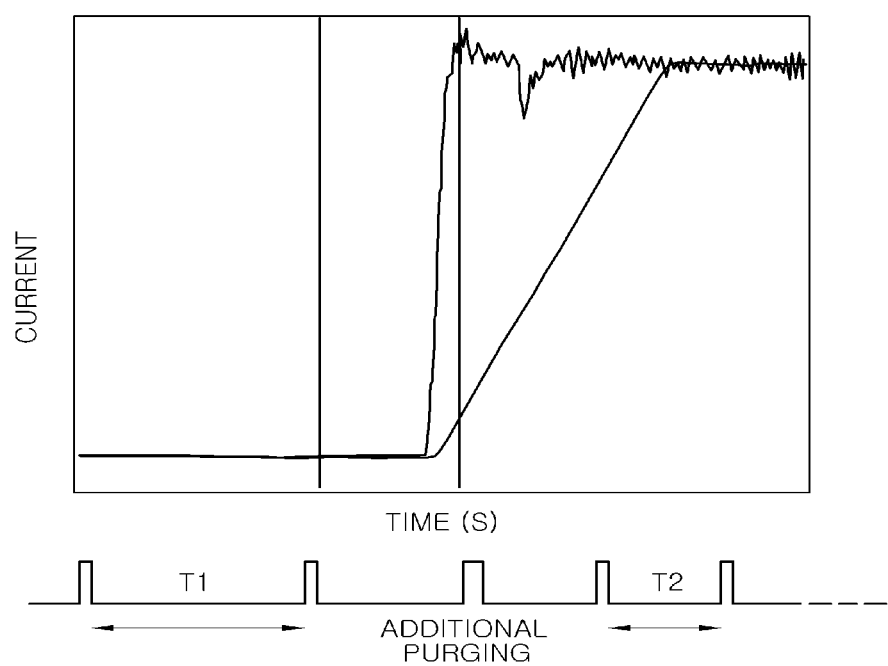

FIG. 8 is an exemplary graph showing an example in which a time at which a driving style or a driving condition transitions from a first level to a second level is determined. As an example, a variation in current magnitude and a purging period are depicted. As shown in a marked portion of the drawing, a time at which the magnitude of current suddenly increases and then the moving average of the current exceeds a threshold is determined to be a level transition time, with the result that a hydrogen purging period may be decreased.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling hydrogen purging, comprising:
 a purge valve disposed at an outlet on an anode side of a fuel cell stack and configured to adjust an amount of emission of hydrogen containing impurities; and
 a controller programmed to adjust an opening and closing cycle of the purge valve based on a required output or an output current of the fuel cell stack,
 wherein the controller is programmed to classify driving states of the fuel cell vehicle into a plurality of driving levels, based on a magnitude of the required output or the output current of the fuel cell stack, to vary the opening and closing cycle of the purge valve to correspond to the plurality of classified driving levels, and to increase an opening time of the purge valve in a transition period longer than opening times of the purge valve in the plurality of driving levels during which the driving level transitions from one of the driving levels to another higher driving level and also the magnitude of the required output or the output current of the fuel cell stack of the driving levels is changed to increase, and wherein the driving levels include a first level at which the magnitude of the required output or the output current of the fuel cell stack is less than or equal to a reference value preset for the required output or the output current and is higher than zero, a second level at which the magnitude of the required output or the output current of the fuel cell stack is greater than the preset reference value, and the transition period at which the magnitude of current increases from the first level to the second level and the moving average of the current exceeds a threshold.

2. The apparatus of claim 1, wherein the controller is programmed to, when the moving average of the required output or the output current of the fuel cell stack is greater than the reference value, decrease the opening and closing cycle of the purge valve.

3. The apparatus of claim 1, wherein the controller is programmed to, when the moving average of the required output or the output current of the fuel cell stack is less than or equal to the reference value, increase the opening and closing cycle of the purge valve.

4. The apparatus of claim 1, wherein the controller is programmed to operate the purge value to adjust the opening and closing cycle of the purge valve when the driving level is the second level to be less than when the driving level is the first level.

5. The apparatus of claim 1, wherein the controller is programmed to increase the opening time of the purge valve in the transition period during which the driving level transitions from the first level to the second level while driving at the first level.

* * * * *